United States Patent [19]

Waugh

[11] 4,099,737
[45] Jul. 11, 1978

[54] BICYCLE BELT DRIVE SYSTEM
[75] Inventor: Dale L. Waugh, Springfield, Mo.
[73] Assignee: Dayco Corporation, Dayton, Ohio
[21] Appl. No.: 791,615
[22] Filed: Apr. 27, 1977
[51] Int. Cl.² ............................................. B62M 9/00
[52] U.S. Cl. ............................ 280/261; 74/230.17 C; 180/33 B
[58] Field of Search .............. 280/261, 259, 260, 250; 180/33 B; 74/229, 230.17 C, 230.17 B, 234

[56] References Cited

U.S. PATENT DOCUMENTS

| 425,390 | /1890 | Rice | 74/230.17 C |
|---|---|---|---|
| 438,124 | /1890 | Warwick | 280/261 |
| 585,416 | /1897 | Wattles | 74/234 |
| 3,625,079 | /1971 | Hoff | 180/33 B |
| 3,954,145 | /1976 | Nesbit | 180/33 B |

Primary Examiner—Joseph F. Peters, Jr.
Assistant Examiner—Donn McGiehan
Attorney, Agent, or Firm—Reuben Wolk

[57] ABSTRACT

A bicycle belt drive system is provided which employs a toothed endless power transmission belt made primarily of polymeric material wherein the teeth of such belt are employed during starting of the bicycle to provide a more positive interconnection between driving and driven pulleys of the drive system and at least one of the pulleys has means for changing the mechanical advantage between the driving pulley and the driven pulley in response to rotational speed changes in the one pulley and thus in the bicycle speed.

20 Claims, 6 Drawing Figures

BICYCLE BELT DRIVE SYSTEM

BACKGROUND OF THE INVENTION

Endless power transmission belts for a drive system of a bicycle have been proposed heretofore; however, bicycle belt drives have not found acceptance in commercial quantities and are deficient in applications where it is desired to provide a positive connection upon starting the bicycle and then changing the mechanical advantage between a driving pulley and driven pulley of a belt drive system as a function of bicycle speed.

SUMMARY

It is a feature of this invention to provide a bicycle drive system which employs an endless power transmission belt and is capable of providing maximum driving force upon starting the bicycle while providing a driving force which varies as a function of bicycle speed.

Another feature of this invention is to provide a bicycle drive system of the character mentioned which operates automatically and without the attention of the bicycle operator.

Another feature of this invention is to provide a bicycle drive system of the character mentioned which employs an endless power transmission belt made primarily of polymeric material.

Another feature of this invention is to provide a bicycle belt drive system which comprises a driving pulley rotatably supported by the bicycle and having a toothed hub portion and a pair of opposite side flanges, a driven pulley carried by a wheel of the bicycle for rotation therewith and having a toothed hub portion and a pair of opposite side flanges with one of the pulleys having at least one of its flanges which is axially movable relative to the other, speed responsive means adapted to engage and move the one flange in response to rotational speed thereof, and a toothed endless power transmission belt having opposed driving surfaces which are adapted to engage the side flanges and having teeth adapted to engage and drive the toothed hub portions of the pulleys. The teeth of the belt engage the toothed portions immediately upon starting the bicycle to provide a more positive interconnection between the driving and driven pulleys and the speed responsive means serves to move the movable flange axially with an increase in rotational speed of one pulley causing the belt to ride radially outwardly on the one pulley with the opposed driving surfaces engaging the flanges of the one pulley to thereby change the mechanical advantage between the driving pulley and driven pulley in response to the speed of the bicycle.

Therefore, it is an object of this invention to provide an endless power transmission belt having one or more of the novel features set forth above or hereinafter shown or described.

Other objects, features, details, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
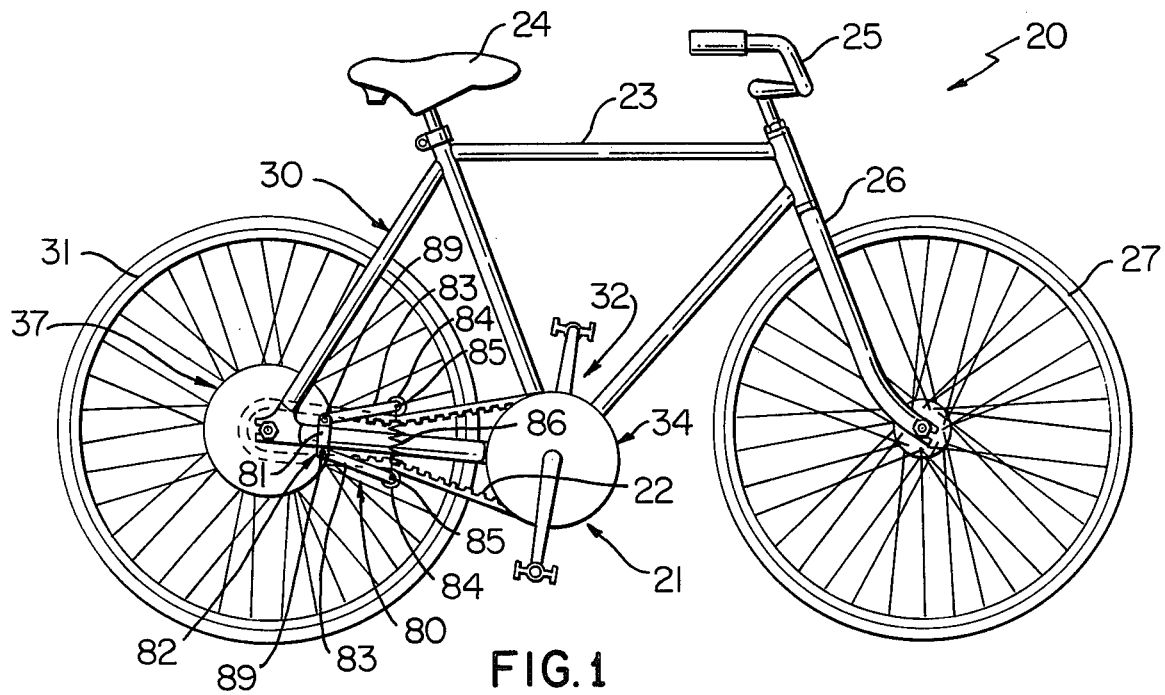
FIG. 1 illustrates a bicycle employing one exemplary embodiment of the belt drive system of this invention.

Reference is now made to FIG. 1 of the drawings which illustrates an exemplary bicycle 20 which employs one exemplary embodiment of the belt drive system of this invention which is designated generally by the reference numeral 21. The belt drive system 21 is of optimum simplicity and economy and such system employs a comparatively inexpensive endless power transmission belt 22 which assures that the bicycle can be operated without slippage between the belt 22 and its associated components during initial starting of the bicycle when the torque or load requirements are at a maximum; and, such drive system has automatic means, which will be readily apparent from the following description, for changing the mechanical advantage between the driving and the driven pulleys thereof in response to the speed of the bicycle.

The bicycle 20 has the usual frame structure or frame 23 supporting a seat 24 for a rider, handlebars 25 connected at the top of a front fork assembly 26 which is pivotally carried by the frame. The fork assembly 26 rotatably supports a front wheel 27 of the bicycle; and, the frame 23 has rear portion 30 which rotatably supports a rear wheel 31. The bicycle has a pedal assembly 32 of known construction and such pedal assembly is rotatably supported at the lower portion of the frame 23.

The belt drive system 21 comprises a driving pulley 34 (see FIG. 2) which is keyed to a shaft 35 by a key 36 whereby the shaft 35 and pulley 34 are rotatably supported by the lower portion of the frame 23. The belt drive system 21 also comprises a driven pulley 37 which is rotatably supported on a shaft 40. The rear wheel 31 is suitably fixed to a portion of the driven pulley 37 by any suitable means (not shown) whereby the wheel 31 and pulley 37 are rotatably supported on the shaft 40 which is fixed to rear portion 30 of the frame 23.

The driving pulley 34 has a toothed hub portion 42 and a pair of opposite side flanges 43, which are symmetrically arranged with respect to the hub portion 42 in the exemplary drive system 21, and the side flanges 43 are fixed relative to the hub portion 42 and serve to confine or retain the belt 22 so that it will operate in its endless path in toothed engagement with the toothed hub portion 42. The side flanges 43 extend outwardly of the hub portion 42 as shown at 44 in FIG. 2 so that such flanges provide their retaining function.

The driven pulley 37 also has a toothed hub portion 45 and a pair of symmetrically disposed opposite side flanges (one of which is axially movable for a purpose to be described and is designated by the reference numeral 46 (see FIG. 4) and the other of which is fixed axially and is designated by the reference numeral 47. The drive system 21 also has speed responsive means designated generally by the reference numeral 50 which are adapted to engage and move the axially movable flange 46 in response to the rotational speed thereof and the operation of the speed responsive means 50 will be described in detail subsequently.

Figure 2:
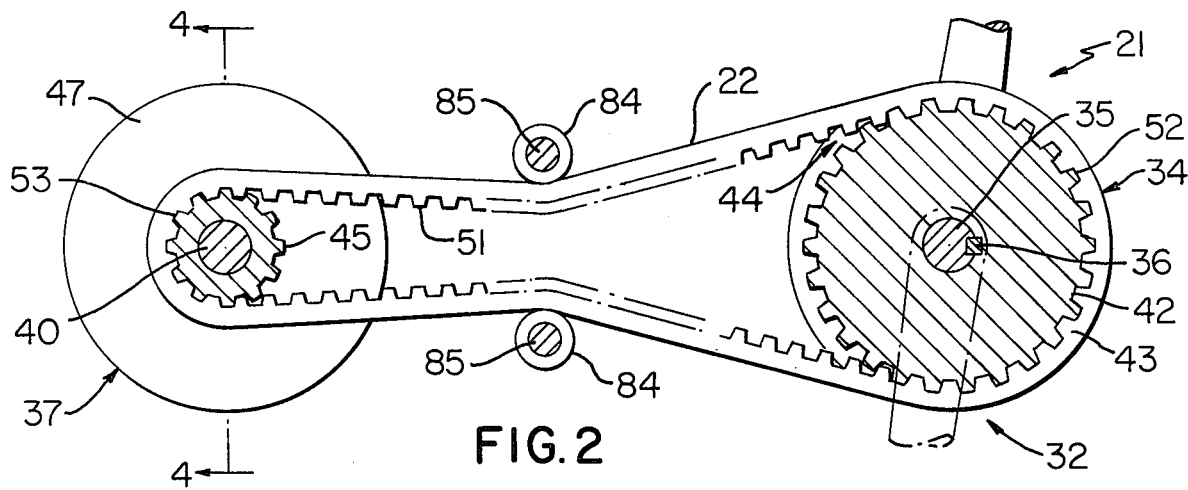
FIG. 2 is a view with parts in elevation, parts in cross-section, and parts broken away illustrating the drive system as employed on the bicycle of FIG. 1 during initial starting of such bicycle.

The belt 22 is a toothed belt, as indicated previously, and as seen in FIG. 2, for example, such belt has a plurality of teeth 51 which have a particular pitch for a purpose now to be described. In particular, it will be seen that the hub portion 42 of the pulley 34 has a plurality of teeth 52 while the hub portion 45 of the pulley 37 has a plurality of teeth 53. The pitch of the teeth 52 in hub portion 42 and the pitch of the teeth 53 in the hub portion 45 is substantially the same and corresponds to the pitch of the teeth 51 in the belt 22 so that the belt 22 may operatively engage the hub portions 42 and 45 to provide a positive traction or engagement, particularly during initial starting of the bicycle 20. Once the bicycle is started and (in this embodiment of the invention) the speed of the rear wheel 31 and in particular the rotational speed of the pulley 47 associated with the rear wheel 31 increases, the movable flange 46 is moved toward the axially fixed flange 47 by the action of the speed responsive means or device 50 while the toothed hub portion 42 of pulley 34 fixed to the pedal assembly 32 continues to operate as during starting with its teeth 52 driving the toothed belt.

Figure 3:
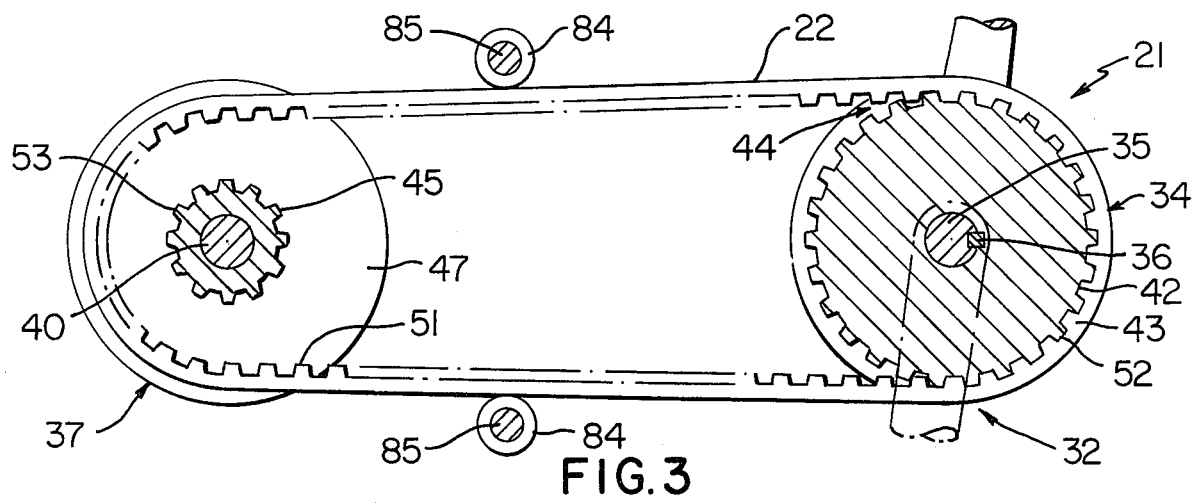
FIG. 3 is a view similar to FIG. 2 illustrating the drive system with the bicycle operating at high speed after starting.
Figure 4:
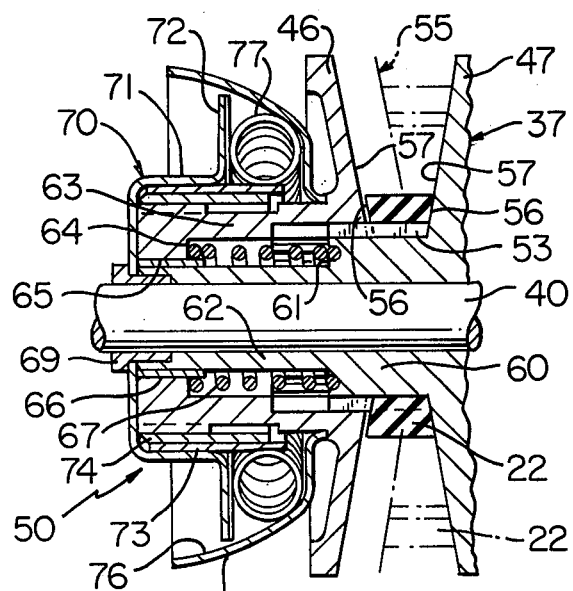
FIG. 4 is a view taken essentially on the line 4—4 of FIG. 2.

As the rotational speed of the pulley 37 increases, the movable flange 46 moves to the dotted line position 55 thereof illustrated in FIG. 4 whereby the belt 22 moves radially outwardly on the flanges of the pulley 37 as shown in FIG. 3. Thus, the speed responsive device 50 serves to move the movable flange 46 axially with an increase in rotational speed of its pulley 37 causing the belt 22 to ride radially outwardly on its pulley 37 so that opposed driving surfaces 56 of the belt 22 engage the flanges 46 and 47 and in particular the diverging driven inside surfaces, each designated by the same reference numeral 57, of the flanges 46 thereby driving same and the pulley to change the mechanical advantage between the driving pulley 34 and the driven pulley 37.

The axially fixed flange 47 has a lateral extension 60 and the hub portion 45 is defined at the base thereof with the teeth 53 defined thereon as an integral part thereof. The lateral extension 60 has a shoulder 61 adjoined by a reduced diameter tubular extension 62 defining its terminal end. The flange 46 has a tubular lateral extension 63 which is particularly adapted to be disposed concentrically around the extension 60 including the teeth 53 thereof. The extension 63 has an inwardly directed shoulder 64 and a cylindrical inside surface 65 at the end of the shoulder which is fixed to a sleeve 66, all of which is axially slidable on the fixed support shaft 40 for pulley 37 and rear wheel 31. A compressed compression spring 67 acts between shoulder 64 and 61 and normally tends to hold flanges 46 and 47 apart with the belt 22 on toothed hub portion as shown in FIG. 4.

The device 50 of drive system 21 also has a housing 70 fixed by means of a bushing 69 to tubular extension 62 which in turn comprises the axially fixed flange 47. The housing 70 has an L-shaped inner portion including a horizontal arm 71 and a vertical arm 72. A pair of sleeve members 73 and 74 are suitably fixed to the arm 71. The device 50 also has a cam housing 75 the inside surface 76 of which serves as a cam and the housing 75 is fixed to flange 46.

A garter spring 77 is disposed in cam housing 75 and the garter spring 77 may consist of two tension springs which are secured together to create in effect a toroidal tension spring, or spring 77 may be a single tension spring joined together in one place to form the same toroidal configuration. The spring is held in place within the cam housing by means of the vertical arm 72 and the sleeve 73 so that any force of the spring as it "grows" outwardly through the action of centrifugal force acting thereon is transmitted through the cam housing 75 and the flange 46 into axial motion. This axial motion of flange 46 thus determines where the belt 22 will ride in the pulley 37 to impart a rotational driving force thereon. The exact amount of axial motion is based on the rotational speed of pulley 37 and it will be appreciated that the device 50 operates automatically and independently without requiring anything of the bicycle operator except pumping the pedals of pedal assembly 32 to the desired speed.

The device 50 disclosed herein is similar to a device of this type disclosed in the U.S. Pat. No. 3,623,377 and reference may be made to this patent for a presentation of such similar device.

The belt drive system 21 also comprises belt slack-tension control means or device designated generally by the reference numeral 80 in FIG. 1 and as such slack-tension control means comprises a base member 81 suitably fixed to the frame 23 as shown at 82 and a pair of arms 83 with each arm having an inner end portion pivotally supported on base member 81 by a pivot 89, and each arm having an outer end portion which has a belt engaging roller 84 rotatably carried thereon by a shaft 85 (FIG. 2). The slack-tension control device 80 has means in the form of a compression spring 86 yieldingly urging the arms 83 toward each other thereby urging the belt engaging rollers 84 against the belt 22 during movement thereof along its endless path. The control device 80 controls the slack and tension in the belt 21 at all operating speeds thereof and regardless of whether belt 22 is being operated during initial starting when its teeth 51 are in toothed engagement with the teeth 53 of hub portion 45 and the teeth 52 of hub portion 42 or subsequent to initial starting when flanges 46 and 47 are engaged and the pulley 37 driven by the sides 56 of belt 22.

The belt 22 may be any suitable power transmission belt known in the art and such belt is made primarily of polymeric material and with optimum economy whereby such belt is comparatively cheaper than sprocket chains employed for a similar purpose on bicycles employing sprocket chains and sprockets instead of an endless power transmission belt and pulleys in accordance with this invention.

In the exemplary embodiment of the belt drive system 21 of this invention illustrated in FIG. 2 the hub portion 42 of the driving pulley 34 has an outside diameter which is larger than the outside diameter of the hub portion 45 of the driven pulley 37. However, it will be appreciated that this need not necessarily be the case and that the toothed hub portions of such pulleys may be reversed in the sizes of their diameters or be the same diameter.

Figure 5:
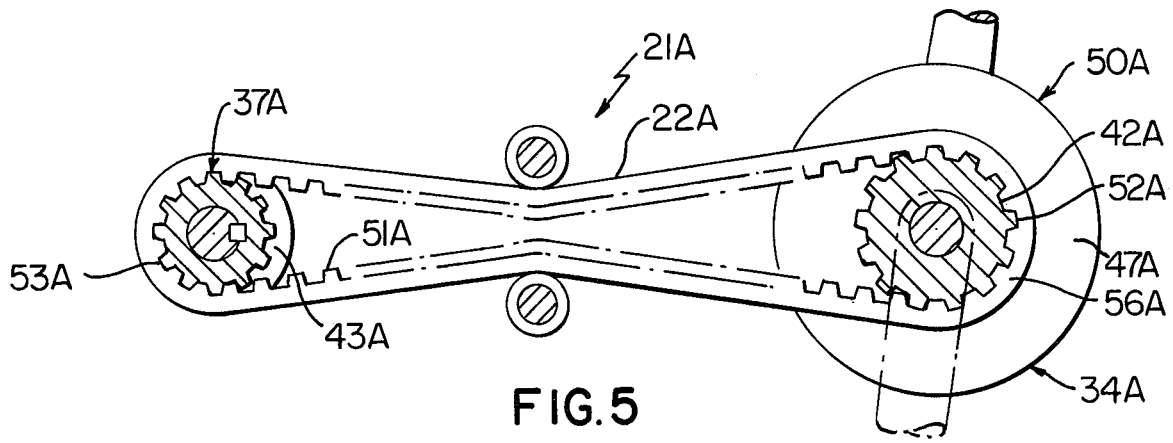
FIG. 5 is a view similar to FIG. 2 illustrating another exemplary embodiment of the belt drive system of this invention.
Figure 6:
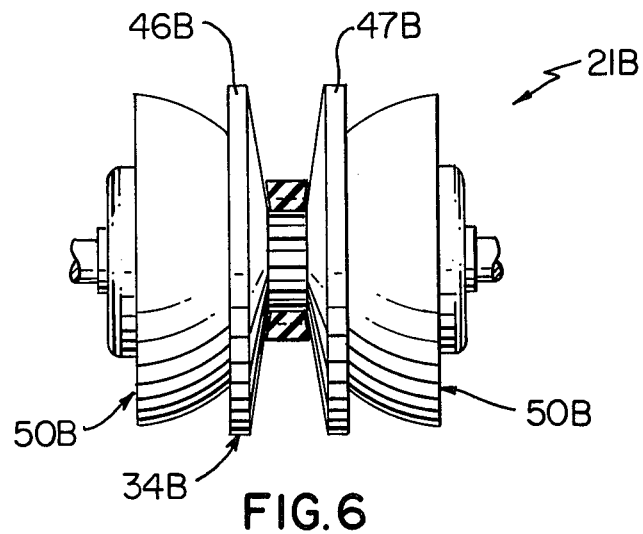
FIG. 6 is a view illustrating a fragmentary portion of another exemplary embodiment of the belt drive system of this invention.

Other exemplary embodiments of the belt drive system of this invention are illustrated in FIGS. 5 and 6 of the drawings, the belt drive systems illustrated in FIGS. 5 and 6 are very similar to the belt drive system 21, therefore, such systems will be designated by the reference numerals 21A and 21B respectively and representative parts of such drive systems will be designated in the drawings by the same reference numerals as in the system 21 (whether or not such representative parts are mentioned in the specification) followed by the letter designation A and not described again in detail.

The belt drive system 21A differs from the belt drive system 21 primarily in that it has an axially fixed side flange 47A, an axially movable side flange (not shown), and a speed responsive device 50A all of which operate with its driving pulley 34A instead of with its driven pulley 37A. In all other respects the system operates in a similar manner with it being understood that driven pulley 37A has its teeth 53A driven by the teeth 51A of belt 22A under all speed conditions. In the case of driving pulley 34A it will be appreciated that the teeth 52A of its hub portion 42A are only driven during initial starting by the teeth 51A of the belt, and once the driving pulley 34A increases in rotational speed the side flanges of such pulley are driven by the opposed driving surfaces 56A of the belt 22A. For ease of understanding the fixed side flanges of pulley 37A will be designated by the reference numeral 43A.

The main difference between the drive system 21B of FIG. 6 and the drive system 21A is that instead of having one axially movable flange 46B on the driving pulley 34B both flanges 46B and 47B are axially movable, each by an associated device 50B which operates in a similar manner as device 50 previously described in connection with the drive system 21.

It will also be appreciated that instead of providing the belt drive system 21 with only one movable flange 46 on the driven pulley 37 such belt drive system may be suitably modified to provide two movable flanges similar to flanges illustrated in FIG. 6 for the system 21B.

While present exemplary embodiments of this invention, and methods of practicing the same, have been illustrated and described, it will be recognized that this invention may be otherwise variously embodied and practiced within the scope of the following claims.

What is claimed is:

1. A bicycle belt drive system comprising, a driving pulley rotatably supported by said bicycle and having a toothed hub portion and a pair of opposite side flanges, a driven pulley carried by a wheel of said bicycle for rotation therewith and having a toothed hub portion and a pair of opposite side flanges, one of said pulleys having at least one of its flanges which is axially movable relative to the other, speed responsive means adapted to engage and move said one flange in response to rotational speed thereof, and a toothed endless power transmission belt having opposed driving surfaces which are adapted to engage said side flanges and having teeth adapted to engage and drive said toothed hub portions of said pulleys, said teeth of said belt engaging said toothed portions immediately upon starting said bicycle to provide a more positive interconnection between said driving and driven pulleys, said speed responsive means serving to move said movable flange axially with an increase in rotational speed of said one pulley causing said belt to ride radially outwardly on said one pulley with said opposed driving surfaces engaging said flanges of said one pulley to thereby change the mechanical advantage between said driving pulley and driven pulley in response to said speed of said bicycle.

2. A drive system as set forth in claim 1 in which said side flanges of said pulleys are symmetrically arranged.

3. A drive system as set forth in claim 2 in which said movable flange has a cam housing secured thereto and means located in said housing urging said movable flange toward the other of said flanges during increase in rotational speed.

4. A drive system as set forth in claim 3 in which said means in said housing comprises mechanical spring means in the form of a garter spring.

5. A drive system as set forth in claim 2 in which said movable flange comprises said driven pulley.

6. A drive system as set forth in claim 2 in which said movable flange comprises said driving pulley.

7. A drive system as set forth in claim 2 and further comprising belt slack-tension control means for said belt.

8. A drive system as set forth in claim 7 in which said belt slack-tension control means comprises a mechanical spring.

9. A drive system as set forth in claim 7 in which said belt slack-tension control means comprises a base member supported by said bicycle, a pair of arms each having an inner end portion supported for pivoting movement on said base member and each having an outer end portion, a belt-engaging roller rotatably carried on each outer end portion, and means yielding urging said arms toward each other and said belt engaging rollers against said belt during movement thereof along its endless path to control the slack and tension in said belt at all operating speeds thereof.

10. A drive system as set forth in claim 2 in which said hub portion of said driving pulley has an outside diameter which is larger than the outside diameter of the hub portion of said driven pulley.

11. A drive system as set forth in claim 2 in which said belt is made primarily of a polymeric material.

12. A drive system as set forth in claim 2 in which the teeth of each of said toothed hub portions have a pitch which corresponds to the pitch of the teeth of said toothed belt.

13. A drive system as set forth in claim 1 in which said speed responsive means is actuated by centrifugal force.

14. A drive system as set forth in claim 1 in which said one pulley has its other flange which is axially movable relative to said one flange, and further comprising another speed responsive means adapted to engage and move said other flange in response to rotational speed thereof, said other speed responsive means cooperating with said firstnamed speed responsive means to position the flanges of said one pulley.

15. A belt drive system as set forth in claim 14 in which each of said speed responsive means is actuated by centrifugal force.

16. A belt drive system as set forth in claim 3 in which said toothed hub portion of said one pulley is defined as a part of one of the flanges of said one pulley.

17. A belt drive system as set forth in claim 16 in which said toothed hub portion is defined as a part of said other flange of said one pulley.

18. A belt drive system as set forth in claim 17 in which said means in said housing comprises a toroidal spring.

19. A belt drive system as set forth in claim 16 in which said one pulley is said driven pulley.

20. A belt drive system as set forth in claim 16 in which said one pulley is said driving pulley.

* * * * *